(12) United States Patent  
Yamaguchi

(10) Patent No.: US 7,245,325 B2
(45) Date of Patent: Jul. 17, 2007

(54) PHOTOGRAPHING DEVICE WITH LIGHT QUANTITY ADJUSTMENT

(75) Inventor: Hiroshi Yamaguchi, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 601 days.

(21) Appl. No.: 09/810,339

(22) Filed: Mar. 19, 2001

(65) Prior Publication Data

US 2002/0012064 A1    Jan. 31, 2002

(30) Foreign Application Priority Data

Mar. 17, 2000    (JP)    ............................. 2000-076224

(51) Int. Cl.
*H04N 5/238*    (2006.01)
(52) U.S. Cl. ...................................... 348/364; 348/363
(58) Field of Classification Search ............ 348/207.99, 348/362, 363, 364, 365, 366, 373, 375, 360, 348/361, 335, 340, 342; 250/208.1
See application file for complete search history.

(56) References Cited

U.S. PATENT DOCUMENTS 4,879,592 A * 11/1989 Ernest ......................... 348/270

5,995,145 A * 11/1999 Viliesid ....................... 348/362

FOREIGN PATENT DOCUMENTS

| JP | 03-70274 | * | 3/1991 |
| JP | 63-220878 | * | 9/1991 |
| JP | 7-298276 | | 11/1995 |
| JP | 10-13680 | | 1/1998 |

OTHER PUBLICATIONS

Patent Abstracts of Japan 10-013680 Jan. 16, 1998.
Patent Abstracts of Japan 07-298276 Nov. 10, 1995.

* cited by examiner

*Primary Examiner*—Tuan Ho
(74) *Attorney, Agent, or Firm*—Sughrue Mion, PLLC

(57) ABSTRACT

The photographing device includes an optical lens, a photographing unit for taking an image of a subject imaged through the optical lens and a light quantity adjustment unit for partially adjusting a light quantity of the image of the subject. The light quantity adjustment unit is provided in an optical path of light carrying the image of the subject and between the optical lens and the photographing unit.

15 Claims, 7 Drawing Sheets

PHOTOGRAPHING DEVICE WITH LIGHT QUANTITY ADJUSTMENT

BACKGROUND OF THE INVENTION

1. Field of the Invention

The present invention relates to a photographing device for taking a photo of an image having a large light quantity ratio while a light quantity adjustment is partially made, and particularly to a photographing device, such as a digital still camera or a digital video camera, using an image pickup element, such as a CCD (charge coupled device), capable of suitably recording an image having a large light quantity ratio.

2. Description of the Related Art

At present, as a device for recording an image, a digital still camera, a video camera or the like is used in a wide range. In such a digital still camera or a video camera, a CCD image pickup element for outputting an output signal on the basis of the quantity of electric charge stored in response to the quantity of light received in a definite time, a CMOS image pickup element, or the like is mainly used, and the obtained output signal is A/D converted, so that an image can be digitized. Although this CCD image pickup element or the like generates a large output signal substantially in proportion to an increase of light quantity within a predetermined range, in the case of a predetermined light quantity or less, an output signal value corresponding to variation of the light quantity can not be obtained and an almost constant output signal value is outputted. Also in the case of exceeding a predetermined light quantity, an output signal corresponding to variation of the light quantity cannot be obtained and an almost constant output signal value is outputted.

That is, there is a limit in the range (dynamic range) of light quantity in which the quantity of storage electric charge substantially proportional to the quantity of light received by the CCD image pickup element or the like is generated, and there is a case where light quantity exceeding the dynamic range or below the dynamic range is received by the CCD image pickup element or the like, as in a backlight scene or a stroboscopic scene.

Thus, in the case where the backlight scene in which the light quantity of a main subject is insufficient against a background is photographed by using the CCD image pickup element or the like, the main subject to be photographed becomes a dark portion (shadow) or the background becomes a bright portion (highlight) in a photographed image, thus leading to dull shadow or washed-out highlight. In the case of the stroboscopic scene, the main subject becomes a bright portion (highlight) or the background becomes a dark portion (shadow), thus leading to dull shadow or washed-out highlight.

Incidentally, in the case where a print output image is outputted by printing an image which has a large light quantity ratio such as a backlight scene or a stroboscopic scene, and is recorded on a photosensitive material such as a film, to a printing paper, in order to prevent dull shadow or washed-out highlight in a part of the image, a well-known dodging processing is performed in an image processing device to reproduce a suitable image. Besides, also in a digital image reproducing device in which an image recorded on a photosensitive material such as a film is photoelectrically read to form digital image data and the digital image data is subjected to digital image processing to output as a print, a similar technique is proposed.

For example, Japanese Patent Unexamined Publication No. Hei. 10-13680 proposes an image processing device and an image processing method for giving an effect of conventionally well-known dodging processing by performing image processing of a digital image in which an intermediate density portion of the image is not changed, but a low density portion of the image and a high density portion thereof are independently compressed or expanded.

However, in the foregoing image processing device and the image processing method, after recording is once made on an image recording medium such as a film, an adjustment is made through the image processing. It is impossible to directly process a scene to be photographed before it is photoelectrically read.

Besides, since such an image processing device is very expensive, although a trader who receives a request for print output can possess it, it is very difficult for an individual to possess it.

Then, in a digital still camera or a video camera using a CCD image pickup element or the like, there is desired a photographing device in which before a scene to be photographed is photoelectrically read, light quantity is adjusted in response to a dynamic range of the CCD image pickup element or the like to take an image.

Under such circumstances, Japanese Patent Unexamined Publication No. Hei. 7-298276 proposes a multi-plate image pickup device in which when an image is photoelectrically picked up by a CCD image pickup element or the like, incident light carrying an image to be read is divided to change a ratio of incident light quantity and the light is received by the image pickup element. According to that, when the image pickup element receives the divided incident light, the light quantity can be separately adjusted, so that photographing with a wide dynamic range becomes possible.

However, since this image pickup device must include a plurality of image pickup elements corresponding to the respective divided incident lights, a device for dividing the incident light, a device for synthesizing images read by the respective image pickup elements, and the like, there are problems that the image pickup device itself becomes complicated, a cost becomes high, and a time required for processing image data becomes long.

SUMMARY OF THE INVENTION

An object of the present invention is therefore to provide a photographing device such as a digital still camera or a video camera, which can solve the above problems and in which an image of a scene having a large light quantity ratio, such as a backlight scene or a stroboscopic scene in which a light quantity ratio of a main subject to a background is large, is suitably photographed, a cost is prevented from increasing,, and a processing time is short.

In order to attain the above object, the present invention provides a photographing device comprising: an optical lens; a photographing unit for taking an image of a subject imaged through the optical lens; and a light quantity adjustment unit for partially adjusting a light quantity of the image of the subject, which is provided in an optical path of light carrying the image of the subject and between the optical lens and the photographing unit.

Preferably, the light quantity adjustment unit is a unit for relatively reducing a light quantity of an area corresponding to a bright portion of the image of the subject when the image is taken by the photographing unit.

Preferably, the light quantity adjustment unit is a unit for relatively increasing a light quantity of an area corresponding to a dark portion of the image of the subject when the image is taken by the photographing unit.

Preferably, the light quantity adjustment unit is a unit for adjusting the light quantity of the image of the subject for each color channel of the photographing unit when the image is taken by the photographing unit.

Preferably, the photographing unit is an image pickup device for photoelectrically reading the image of the subject or a unit for recording the image of the subject on a photosensitive material.

Preferably, the light quantity adjustment unit is a filter through which the light carrying the image of the subject is transmitted and is a light transmittance variable filter which changes a light transmittance of an area corresponding to a portion of the image of the subject where the light quantity is adjusted.

Preferably, the light quantity adjustment unit is a reflection plate for partially changing a light receiving time in which the photographing unit receives reflected light, correspondingly to a portion of the image of the subject where the light quantity is adjusted, by changing a reflection angle of the light carrying the image of the subject.

Preferably, the light quantity adjustment unit is disposed at a position deviating from an imaging position where the image of the subject is imaged by the optical lens.

Preferably, when the photographing unit is a unit for reading the image of the subject photoelectrically, the photographing device further includes a condition setting unit for setting an adjustment area of the light quantity adjustment unit corresponding to a light quantity adjustment portion of the image of the subject, based on image data of a pre-read image which was obtained by previously reading the image of the subject under a predetermined photographing condition by using the photographing unit.

Preferably, the condition setting unit sets for each color channel of the photographing unit, the adjustment area of the light quantity adjustment unit corresponding to the light quantity adjustment portion of the image of the subject, based on image data obtained for the each color channel from the pre-read image read by the photographing unit.

Preferably, when the photographing unit is a first photoelectric converter for reading the image of the subject photoelectrically, the photographing device further includes: a second photoelectric converter which is different from the first photoelectric converter; and a condition setting unit for setting an adjustment area of the light quantity adjustment unit corresponding to a light quantity adjustment portion of the image of the subject, based on image data of an image obtained by reading the image of the subject with the second photoelectric converter.

Preferably, the condition setting unit sets for each color channel of the second photoelectric converter, the adjustment area of the light quantity adjustment unit corresponding to the light quantity adjustment portion of the image of the subject, based on image data obtained for the each color channel from the image read by the second photoelectric converter.

Preferably, when the photographing unit is a unit capable of photoelectrically taking the image of the subject in succession as a plurality of images, the photographing device further includes a condition setting unit for setting an adjustment area of the light quantity adjustment unit corresponding to a light quantity adjustment portion of the image of the subject, based on image data of an image taken in a temporally precedent manner.

Preferably, the condition setting unit determines a degree of a motion from the plurality of images taken in succession and sets the adjustment area of the light quantity adjustment unit in accordance with the degree of the motion.

Preferably, when the photographing unit is a first photoelectric converter for reading the image of the subject photoelectrically, the photographing device further includes a second photoelectric converter which is different from the first photoelectric converter and the image data of the image taken in the temporally precedent manner is image data of an image obtained by reading the image of the subject with the second photoelectric converter.

Preferably, the condition setting unit includes a signal converter for converting the image data into bright and dark image data, and sets the adjustment area based on the bright and dark image data obtained in the signal converter.

Preferably, the condition setting unit includes a low frequency component extractor for extracting a low frequency component of the bright and dark image data obtained by converting in the signal converter, and sets the adjustment area based on the thus extracted low frequency component.

Preferably, the condition setting unit sets the adjustment area of the light quantity adjustment unit, based on information for designating a position of the light quantity adjustment portion on the pre-read image, an image read with a second photoelectric converter or an image taken in a temporally precedent manner.

Preferably, when the photographing unit is a unit for reading the image of the subject photoelectrically, information on an adjustment of the light quantity in the light quantity adjustment unit is recorded and held together with image data read after the adjustment has been made by the light quantity adjustment unit.

DETAILED DESCRIPTION OF THE PREFERRED EMBODIMENTS

Hereinafter, a photographing device of the present invention will be described on the basis of preferred embodiments illustrated in the accompanying drawings.

Figure 1:
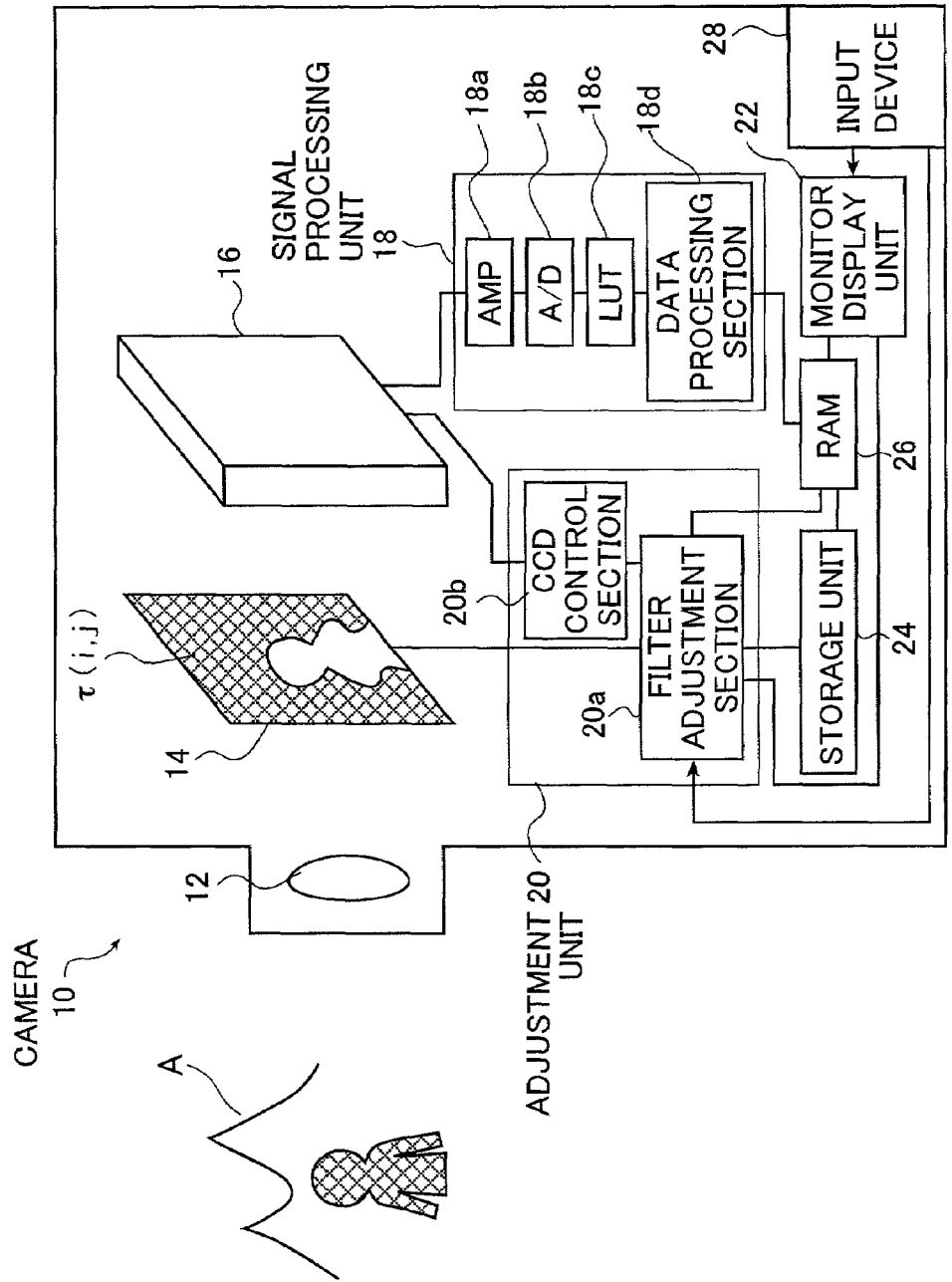
FIG. 1 is a structural view showing a schematic structure of a digital still camera as an embodiment of a photographing device of the present invention.

FIG. 1 is a structural view of a digital still camera (hereinafter referred to as a camera) 10 as a preferred embodiment of a photographing device of the present invention. Incidentally, the photographing device of the present invention is not limited to the digital still camera as illustrated in this embodiment, but may be a video camera for taking a motion picture or a conventional analog camera for taking a picture by using a photosensitive material such as a silver salt film.

The camera 10 is a single plate image pickup device, and mainly includes an image pickup lens 12, a liquid crystal filter 14 for partially changing the light intensity of incident light carrying an optical image of a subject A (FIG. 1 shows a photo subject of a backlight scene in which a background is bright and a main subject is dark), which is incident from the image pickup lens 12 and has a large light quantity ratio, by controlling the light transmittance of a liquid crystal cell, a CCD area sensor 16 for photoelectrically reading an image of the subject A which was adjusted in light quantity through adjustment of the light intensity made by the liquid crystal filter 14, a signal processing unit 18 for converting a signal read by the CCD area sensor 16 into image data, an adjustment unit 20 for setting an adjustment area of the light transmittance of the liquid crystal filter 14, its adjustment quantity, a shooting time of the CCD area sensor 16, and the like, a monitor display unit 22, and a storage unit 24 for storing and holding image data of a picked up image and information relative to the light transmittance of the liquid crystal filter 14, and in addition, includes a RAM 26 for temporarily storing the image data and an input device 28 for inputting various conditions in accordance with the image displayed on a monitor, and these are controlled and managed by a CPU (not-shown). Although not shown, it is needless to say that the camera 10 is provided with an operating unit in which operations necessary for photographing are performed.

The image pickup lens 12 is an optical lens for forming (imaging) an optical image of the subject A on a light receiving plane of the CCD area sensor 16, and although the lens is selected in view of brightness F-value, focal distance f, resolution, spectral transmittance, and the like, it is not particularly limited.

The liquid crystal filter 14 is used as a light quantity adjustment device for partially changing the light intensity of the incident light carrying the optical image of the subject A incident from the image pickup lens 12 by controlling the light transmittance $\tau$ of the liquid crystal cell, and is constituted by a number of liquid crystal cells arranged in a matrix form and deflection plates. A position of each of the liquid crystal cells is made to correspond to a pixel position of the CCD area sensor 16, and the light transmittance $\tau$ is independently adjusted.

It is desirable that the liquid crystal filter 14 is disposed at a position deviating from an imaging position of the image of the subject A. This is because when the filter is disposed near the imaging position of the image of the subject A, a distribution image of light transmittance of the respective liquid crystal cells of the liquid crystal filter 4 is clearly reflected on the image of the subject A. It is appropriate that the cell density of the liquid crystal cells is equal to or less than the pixel density of after-mentioned CCD image pickup elements arranged in the CCD area sensor 16.

The CCD area sensor 16 is an image pickup device for picking up a color image from the image of the subject A formed through the image pickup lens 12 by an R pixel, a G pixel and a B pixel constituting the CCD image pickup element of the CCD area sensor 16, and a large number of CCD image pickup elements are arranged in a matrix form. Each of the CCD image pickup elements includes a photodiode for storing electric charge corresponding to the quantity of light received in a uniform and constant shooting time, and a transfer driving portion for transmitting the stored electric charge quantity toward a predetermined direction and outputting it as an output signal.

Since the output signal outputted from the transfer driving portion has an output value corresponding to the quantity of the light received in the constant shooting time, in a suitable range of the quantity of the received light, the output signal has an output value corresponding to the light intensity of the image received by the CCD area sensor 16. Such an output signal is sent to the signal processing unit 18.

Incidentally, the pixel size of the CCD area sensor 16 is not particularly limited, and the pixel size maybe, for example, VGA (Video Graphics Array) having an effective pixel number of 640×480 pixels, or the like.

The signal processing unit 18 is a portion for converting the output signal outputted from the CCD area sensor 16 into image data, and includes an amplifier (AMP) 18a, an A/D converter 18b, a first LUT 18c, and a data processing section 18d.

In the signal processing unit 18, the output signal is first amplified by the amplifier 18a, and is converted into a digital signal by the A/D converter 18b, and then, Log conversion is made by the first LUT 18c, and dark correction, smear correction, flaw defect correction, shading correction, or the like is performed in the data processing section 18d to obtain the image data. The obtained image data is stored in the RAM 26.

The adjustment unit 20 includes a filter adjustment section 20a and a CCD control section 20b.

The filter adjustment section 20a is a condition setting portion for setting an adjustment area of the light transmittance of the liquid crystal filter 14 and an adjustment quantity thereof. On the basis of the image of the subject A read under conditions that the light transmittance $\tau$ of the liquid crystal filter 14 is a previously set value, for example, the light transmittance is set to 50%, and the shooting time of the CCD area sensor 16 is a previously set time, for example, 1/100 second, that is, on the basis of a pre-read image obtained by previously reading the same image before the subject A is photographed, the adjustment area of the light transmittance of the liquid crystal filter 14 and the adjustment quantity are set.

That is, the image of the subject A is read under the conditions of the previously set light transmittance $\tau$ of the liquid crystal filter 14 and the shooting time of the CCD area sensor 16, and the image data of the pre-read image subjected to the processing in the signal processing unit 18 is read out from the RAM 26, and on the basis of the pre-read image of the subject A, the adjustment area of the light transmittance $\tau$ of the liquid crystal filter 14 and the adjustment quantity are set, and a control signal for controlling the liquid crystal filter 14 is generated.

Figure 2:
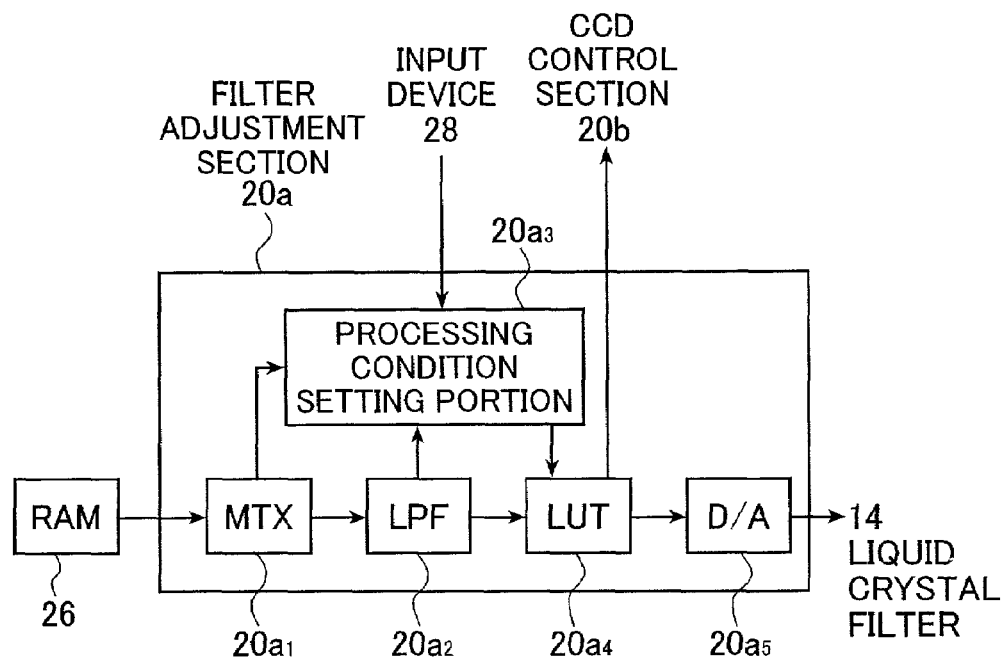
FIG. 2 is a structural view showing a schematic structure of a filter adjustment section of the digital still camera shown in FIG. 1.

As shown in FIG. 2, the filter adjustment section 20a includes an MTX arithmetic portion $20a_1$, a low pass filter (LPF) $20a_2$, a processing condition setting portion $20a_3$, a second LUT $20a_4$, and a D/A converter $20a_5$.

The MTX arithmetic portion $20a_1$ is a signal conversion portion for obtaining bright and dark image data, which becomes bright and dark information of the image, from the image data of the read pre-read image. That is, from image data Ir obtained from the R pixel, image data Ig obtained from the G pixel, and image data Ib obtained from the B pixel, by a well-known YIQ transformation, a Y component for each pixel is obtained as in the following expression (1)

$$Y=0.3Ir+0.59Ig+0.11Ib \quad (1)$$

In this embodiment, although the Y component is used as the bright and dark image data, the present invention is not limited to this, but for example, an average value of the image data Ir, Ig and Ib of the respective pixels may be used as the bright and dark image data.

The bright and dark image data is obtained in order to extract a bright portion (highlight) and a dark portion (shadow) in the pre-read image as described later.

The obtained bright and dark image data is sent to the low pass filter $20a_2$ and the processing condition setting portion $20a_3$.

The low pass filter $20a_2$ is a low frequency extraction device for performing a low pass filter processing of the Y component as the bright and dark image data obtained in the MTX arithmetic portion $20a_1$ to extract a low frequency component. The reason why the Y component is subjected to the low pass filter processing is as follows: Although the bright portion and the dark portion of the image of the subject A are extracted from the Y component of the image data of the pre-read image, and the light transmittance τ of the area of the liquid crystal filter 14 corresponding to the bright portion and the dark portion is adjusted, if the light transmittance is discontinuously (abruptly) changed in the periphery of this area, there is a case where the image of the subject A read by the CCD area sensor 14 has an unnatural boundary, that is, the density is abruptly changed at the boundary of the bright portion and the dark portion in which the light quantity has been adjusted. The low pass filter processing is performed in order to prevent the occurrence of such an unnatural boundary. That is, the distribution of the light transmittance τ of the liquid crystal filter 14 is prepared on the basis of the blur image of the bright and dark image made of the image data of the Y component. Particularly, in the case where the cell density of the liquid crystal filter 14 is almost equal to the pixel density of the CCD area sensor 16, by gently changing the light transmittance of the liquid crystal filter 14, the density change at the boundary of the bright portion and the dark portion in which the light quantity has been adjusted becomes gentle also in the image of the subject A to be photographed, and it is possible to prevent the image from having the unnatural boundary.

Further, as described above, since the liquid crystal filter 14 is arranged at the position deviating from the imaging position of the image of the subject A, in the bright portion and the dark portion of the image of the subject A picked up by the CCD area sensor 16, the light quantity is adjusted further without producing an unnatural feeling.

Besides, since the liquid crystal filter 14 is disposed at the position deviating from the imaging position of the image of the subject A, even in the case where the cell density of the liquid crystal filter 14 is coarser than the pixel density of the CCD area sensor, the distribution of the light transmittance τ corresponding to the cell density of the coarse liquid crystal cell can be adjusted by the low pass filter processing performed in the low pass filter $20a_2$ for the image data of the Y component of the pre-read image corresponding to the pixel density of the CCD area sensor 16.

Incidentally, the low frequency component extracted by the low pass filter processing means a frequency component of a cut off frequency or less as determined on the basis of a Nyquist space frequency determined from the pixel density of the CCD area sensor 16. For example, a frequency component of ⅕ or less of the Nyquist space frequency, or the like is an example, and the cut off frequency of the low frequency component is previously set or is set after having been inputted by the input device 28.

The low pass filter $20a_2$ like this performs a digital filter processing using the image data around a pixel position of interest, and for example, an FIR (Finite Impulse Response) type low pass filter or an IIR (Infinite Impulse Response) type low pass filter may be used. Preferably, it is appropriate that the IIR type low pass filter is used from the point that the low frequency component can be extracted with a small circuit.

Besides, in this embodiment, after the Y component of the image data of the pre-read image is extracted in the MTX arithmetic portion $20a_1$, the low frequency component of the Y component is extracted by the low pass filter $20a_2$. However, the order of the MTX arithmetic portion $20a_1$ and the low pass filter $20a_2$ may be exchanged so that the Y component is extracted after the low frequency component of the image data of the R pixel, the G pixel, and the B pixel of the pre-read image is first extracted.

Besides, in this embodiment, although the low frequency component of the Y component of the image data of the pre-read image is extracted by using the low pass filter $20a_2$, instead of the low pass processing of the low pass filter $20a_2$, the image data of the Y component may be used as the image data corresponding to a unit cell of the liquid crystal cell of the liquid crystal filter 14 or a plurality of liquid crystal cells by thinning processing. Even when the coarse light transmittance distribution of the liquid crystal filter 14 obtained from the image data of the Y component which was obtained by the thinning processing and is coarse as compared with the pixel of the CCD area sensor 16 is used, the bright portion and the dark portion of the image of the subject A taken by the CCD area sensor 16 are adjusted in the light quantity without having an unnatural boundary, since the liquid crystal filter 14 is disposed at the position deviating from the imaging position of the image of the subject A, as described above.

The low frequency component of the Y component of the image data obtained by the low pass filter $20a_2$ is sent to the processing condition setting portion $20a_3$ and the second LUT $20a_4$.

Figure 3A:
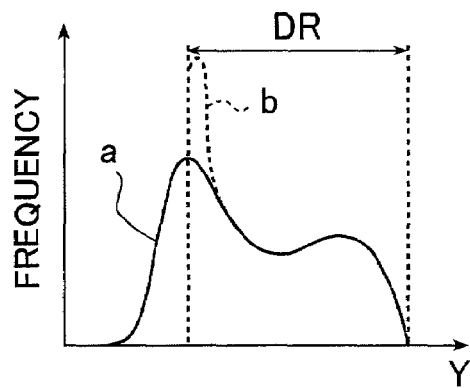
FIGS. 3A to 3F are explanatory views for explaining examples of light quantity adjustment made in a photographing device of the present invention.
Figure 3B:
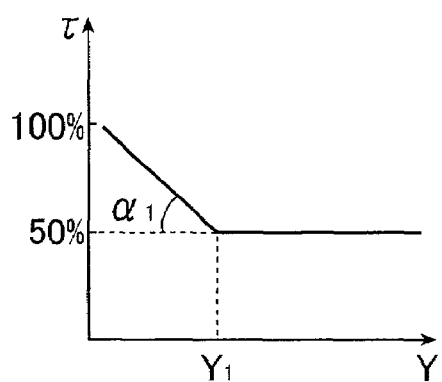
Figure 3C:
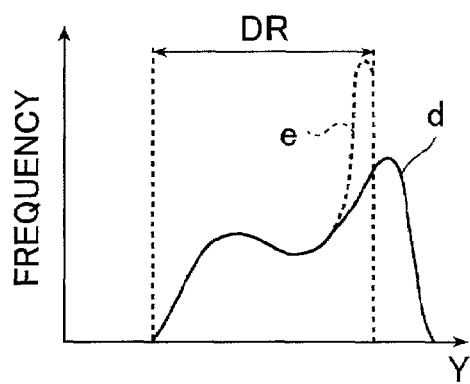
Figure 3D:
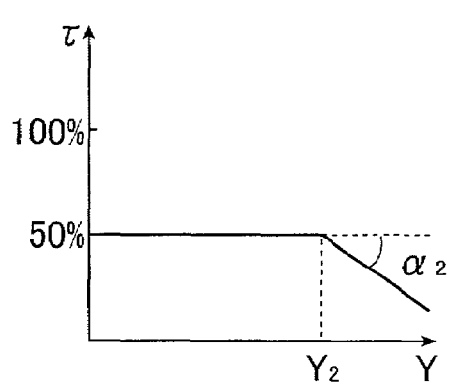
Figure 3E:
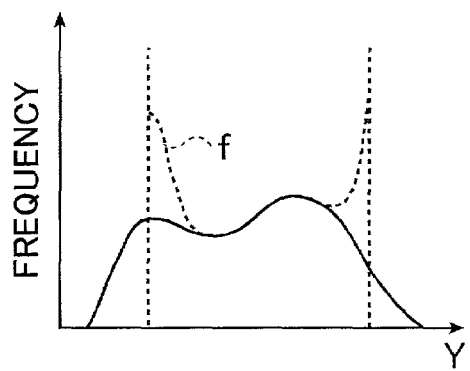

The processing condition setting portion $20a_3$ is a portion which generates histograms in FIGS. 3A, 3C and 3E from the Y component of the image data obtained in the MTX arithmetic portion $20a_1$, and on the basis of this, determines conditions under which the light transmittance τ of the liquid crystal filter 14 is adjusted. That is, from the image data of the Y component corresponding to the bright and dark portions of the pre-read image, this portion sets the adjustment area of the light transmittance where the light transmittance τ of the liquid crystal filter 14 is changed, and its adjustment value.

As set forth above, the CCD image pickup element such as the CCD area sensor 16 has limitation in the range of light quantity where the quantity of storage electric charge substantially proportional to the quantity of received light is generated, that is, in the dynamic range. In the case where an image is picked up by an ideal image pickup sensor having no limitation in the dynamic range, the histogram of the Y component of the image of the subject A is distributed up to a range exceeding the dynamic range DR of the CCD area sensor 16.

For example, FIG. 3A shows the histogram of the Y component in which the image of the dark portion (shadow) becomes dull since the quantity of light received by the CCD area sensor 16 is insufficient. That is, in the case where an image is picked up by an ideal image pickup sensor, the histogram of the Y component shows the distribution shown by a solid line "a" in which the image of the dark portion does not become dull. However, in the case where an image is picked up by the CCD area sensor 16 having the limitation in the dynamic range DR, under the influence of the dynamic range DR, the image data of the Y component up to a lower limit value of the dynamic range R is clipped at the lower limit value as indicated by a broken line "b", and the image becomes improper.

Then, when the formed image of the subject A is read by the CCD area sensor 16, the light transmittance distribution of the liquid crystal filter 14 is controlled and the light quantity of the image of the subject A is partially adjusted, so that the image data to be read is not clipped at the lower limit value or the upper limit value of the dynamic range DR but is contained within the range of the dynamic range DR of the CCD area sensor 16, and the image of the dark portion of the subject A is prevented from becoming dull.

Although a method for setting a value of the light transmittance $\tau$ is not particularly limited, a method as shown in FIG. 3B is illustrated in which in the case where the value of the image data of the Y component obtained with the low pass filter 20$a_2$ is larger than a value $Y_1$, the light transmittance $\tau$ used is a value (in the drawing, light transmittance is 50%) of the light transmittance when the pre-read image is read, and in the case where the value is $Y_1$ or less, the value of the light transmittance $\tau$ is linearly increased with an inclination $\alpha_1$ as the value of the Y component goes away from the value $Y_1$. In this case, the value $Y_1$ and the inclination $\alpha_1$ as adjustment values of the light transmittance $\tau$ are adjustment parameters for performing light quantity adjustment, and may be previously set in accordance with the dynamic range DR of the CCD area sensor 16. Alternatively, the value $Y_1$ may be set in such a manner that with respect to the dark portion and the bright portion of the pre-read image displayed on the monitor display unit 22, the portion or a typical position included in the portion is designated by the input device 28 such as a pointing device, and the inclination $\alpha_1$ may be set by inputting a numerical value or the like through the input device 28.

In the case where the value $Y_1$ as the adjustment parameter is previously set, the adjusted position of the light transmittance of the liquid crystal filter 14 corresponding to the pixel position of the image data is found by extracting the image data of the Y component having a lower value than this value $Y_1$, and the adjustment area of the light transmittance is automatically set. Besides, the adjustment area of the light transmittance of the liquid crystal filter 14 may be correspondingly set in such a manner that a photographer sees the bright portion and the dark portion of the pre-read image displayed on the monitor display unit 22 and designates the portion or the typical position included in the portion with the input device 28. Further, in this case, the adjustment area of the light transmittance of the liquid crystal filter 14 may be automatically set in such a manner that the value $Y_1$ is set from the average value of the image data of the Y component of the designated portion or the value of the image data of the Y component of the designated typical position, and the image data of the Y component having a lower value than this value $Y_1$ is extracted.

In this way, a light transmittance distribution $\tau$ (i, j) of a position (i, j) of the liquid crystal cell of the liquid crystal filter 14 corresponding to the bright portion or the dark portion of the pre-read image is set.

The setting of the light transmittance $\tau$ is carried out in the same way even in the case where the image of the bright portion of the subject A becomes washed-out and the Y component exceeding the upper limit value of the dynamic range DR is clipped at the upper limit value as indicated by a broken line "e" under the restriction of the dynamic range DR, although the histogram distribution of the Y component shown in a solid line "d" should have been originally indicated without being restricted by the dynamic range DR. That is, a method as shown in FIG. 3D is illustrated in which the light transmittance $\tau$ used is a value of the light transmittance when the pre-read image is read (in FIG. 3D, the light transmittance is 50%), and in the case where the value is $Y_2$ or higher, the value of the light transmittance $\tau$ is linearly decreased with an inclination $\alpha_2$ as the value of the Y component goes away from the value $Y_2$.

Figure 3F:
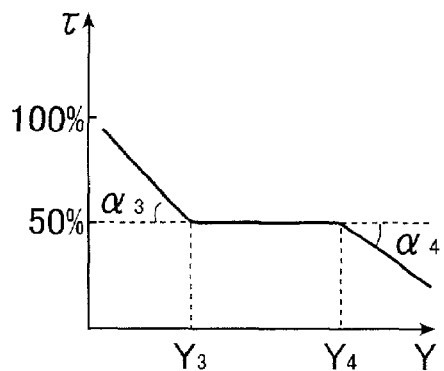

Further, as shown by the histogram of FIG. 3E, in the case (broken line f) where the bright portion (highlight) and the dark portion (shadow) of the image of the subject A exceed the range of the dynamic range DR and are clipped at the upper limit value and the lower limit value, that is, in the case where the image becomes washed-out in the bright portion and dull in the dark portion, when the value of the image data of the Y component is $Y_3$ or less, the value of the light transmittance $\tau$ is linearly increased with an inclination $\alpha_3$ as the value of the Y component goes away from the value $Y_3$, and when the value of the image data of the Y component is $Y_4$ or higher, the value of the light transmittance $\tau$ is linearly decreased with an inclination $\alpha_4$ as the value of the Y component goes away from the value $Y_4$. This is shown in FIG. 3F. That is, the light transmittance $\tau$ of the liquid crystal filter 14 is set so as to compress the dynamic range of the image density of the subject A without changing the portion having an intermediate value of the Y component, or the range between the values $Y_3$ and $Y_4$ in FIG. 3F, so that the image of the bright portion and the dark portion of the subject A does not improper. Of course, the value $Y_3$ may be the same as the value $Y_4$.

The values $Y_2$, $Y_3$ and $Y_4$ and inclinations $\alpha_2$, $\alpha_3$ and $\alpha_4$ as the adjustment values of the light transmittance $\tau$ and may be previously set, or a photographer may set the values while seeing the pre-read image of the subject A displayed on the monitor display unit 22.

Thus, when the subject A is photographed, the light quantity of the bright portion of the image of the subject A is decreased, and that of the dark portion thereof is increased by adjusting the light transmittance distribution $\tau$ (i, j).

In the example shown in FIG. 3F, the adjustment areas of two kinds of light transmittances corresponding to the bright portion (highlight) and the dark portion (shadow) of the pre-read image are set. However, the number of each of the two kinds of areas is not necessarily one, but each may be composed of a plurality of sub-areas corresponding to the number of the bright portions or the dark portions. For example, as in a backlight scene in which a plurality of main subjects exist at separate positions, the adjustment area may be composed of a plurality of sub-areas corresponding to the respective dark portions for the main subjects. Further, three or four types of the adjustment areas of the light transmittance may be optionally used.

The information obtained about the functions as shown in FIGS. 3B, 3D and 3F is sent to the second LUT portion $20a_4$.

Incidentally, in this embodiment, the processing condition for the light quantity adjustment is set on the basis of the Y component of the image data obtained in the MTX arithmetic portion $20a_1$. However, the processing condition for the light quantity adjustment may be set on the basis of the low frequency component in which the Y component of the image data is subjected to the low pass filter processing in the low pass filter $20a_2$.

The second LUT $20a_4$ is a portion for preparing and holding a look up table of the functions corresponding to FIGS. 3B, 3D and 3F from the sent information on the functions. On the basis of the low frequency component of the Y component of the image data, the value of the light transmittance $\tau$ of the liquid crystal filter 14 is automatically set by referring to the look up table, and the adjustment quantity of the light transmittance $\tau$ is determined.

The data on the light transmittance distribution $\tau$ (i, j) obtained in the second LUT $20a_4$ is sent to the D/A converter $20a_5$ and the CCD control section 20b.

The D/A converter $20a_5$ is a portion for converting the data on the light transmittance distribution $\tau$ (i, j) into an analog control signal, and sends the obtained control signal to the liquid crystal filter 14.

The CCD control section 20b is a portion for adjusting a shooting time or storage time previously set in the CCD area sensor 16 on the basis of the data of the light transmittance distribution $\tau$ (i, j). The light transmittance distribution $\tau$ (i, j) of the liquid crystal filter 14 is adjusted, so that the light quantity of the image of the subject A received in the shooting time is changed to prevent under exposure or over exposure.

The monitor display unit 22 is a liquid crystal display device which displays the photographed image including the subject A or the pre-read image, and is used to designate as required the bright portion (highlight), the dark portion (shadow), or its typical position on the display image. Besides, the monitor display unit 22 is a portion in which a screen for inputting parameters or the like necessary for the light quantity adjustment by the input device 28 such as a keyboard or a pointing device as required.

The input device 28 is a keyboard, a pointing device, or the like, and is used for adjusting the light transmittance $\tau$ for the light quantity adjustment by the liquid crystal filter 14, or instructing the adjustment thereof, or setting various parameters for the light quantity adjustment, such as the value $Y_1$ and the inclination $\alpha_1$.

The storage unit 24 is a memory for recording and holding information on the light quantity adjustment, such as the light transmittance distribution $\tau$ (i, j) of the liquid crystal filter 14 at the time of photographing and the shooting time of the CCD area sensor 16, in addition to the image data of the photographed subject A. The storage unit 24 may include, for example, a detachable image data recording medium including a memory card such as SmarkMedia or MemoryStick, or a memory for storing information.

When the information on the light quantity adjustment, such as the light transmittance distribution $\tau$ (i, j) of the liquid crystal filter 14 and the shooting time is recorded and held together with the image data, it is possible to obtain the image of the subject A, which could have been obtained in the case where the light transmittance is not adjusted by the liquid crystal filter 14, from the image data, the light transmittance distribution $\tau$ (i, j), the shooting time and the like after the image is taken. Especially, in the case where the cell density of the liquid crystal filter 14 is equal to the pixel density of the CCD area sensor 16, the image in which the light transmittance is not adjusted by the liquid crystal filter 14 can be completely reproduced, and the adjustment in the bright and dark portions of the image can be again performed by the image processing method as disclosed in Japanese Patent Unexamined Publication No. Hei. 10-13680.

The RAM 26 is a frame memory for temporarily storing the respective image data of the R pixel, the G pixel, and the B pixel, captured by the CCD area sensor 16, and is connected to the filter adjustment section 20a, the monitor display unit 22, and the storage unit 24.

Although omitted in this embodiment, the RAM 26 also includes an auto-iris mechanism for controlling a lens stopdown value of the image pickup lens 12 in connection with the adjustment unit 20, and an autofocus mechanism for automatically setting the focal distance of the subject A.

The camera 10 is basically constructed as described above.

Incidentally, the photographing device of the present invention may be a conventional type in which a picture is taken by using a photosensitive material such as a silver salt film, as set forth above. In this case, it is appropriate that the pre-read image is read by the CCD area sensor or the like, and the thus read image is exposed and recorded using the photosensitive material such as the silver salt film after the light transmittance $\tau$ of the liquid crystal filter 14 is adjusted.

Besides, in the photographing device of the present invention, instead of the liquid crystal filter 14, photochromic glass containing silver halide crystal which changes light transmittance in accordance with the intensity of light, or the like maybe used as the light quantity adjustment device.

Further, as the light quantity adjustment device of the photographing device of the present invention, there may be used a reflection plate for reflecting incident light carrying the image of the subject incident through the image pickup lens, which changes a reflection angle of the reflected light so that a light receiving time in which the image pickup device such as the CCD area sensor receives the reflected light is partially adjusted in correspondence with the portion of the image of the subject A where the light quantity is adjusted. For example, a digital still camera 10' using a digital micro mirror (DMD) chip 14' as shown in FIG. 4 is exemplified.

Figure 4:
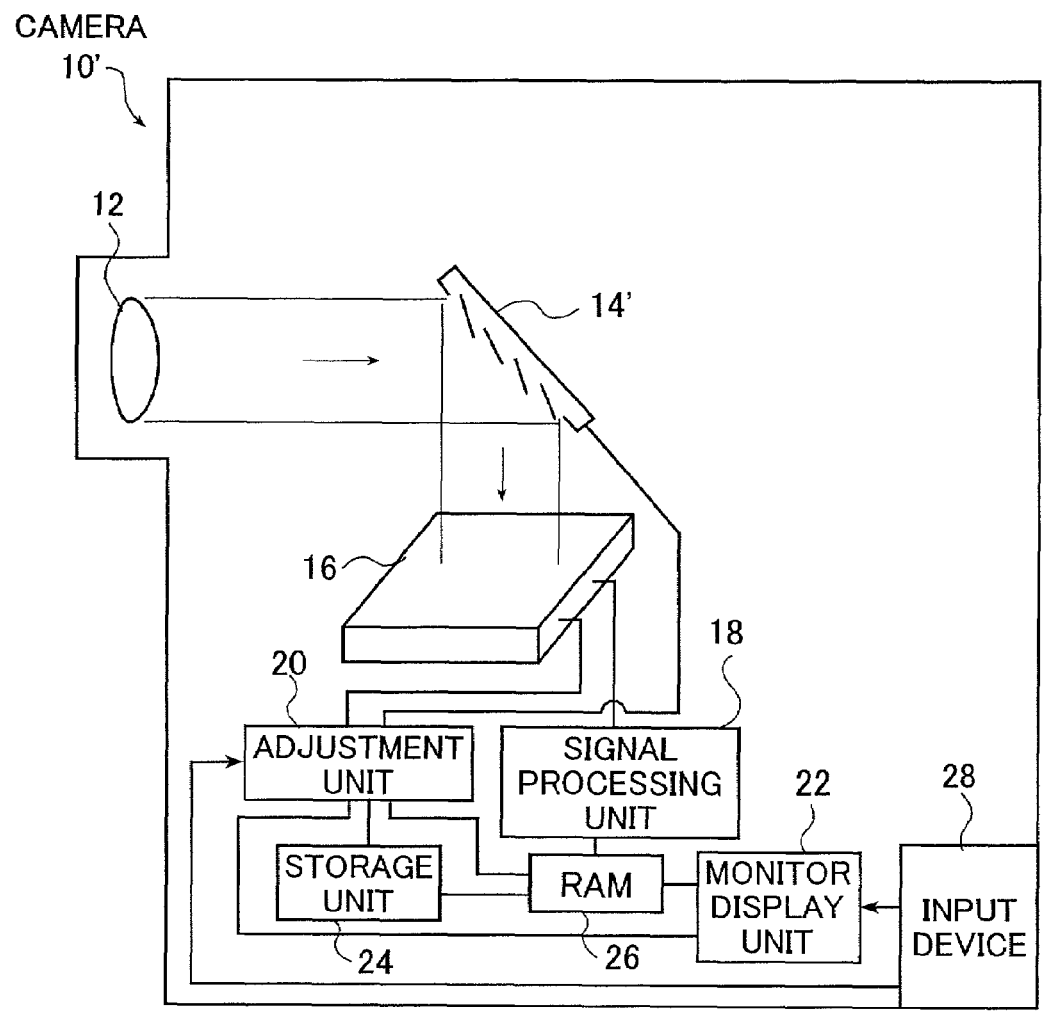
FIG. 4 is a structural view showing a schematic structure of a digital still camera as another embodiment of a photographing device of the present invention.

Since the structure of the digital still camera 10' shown in FIG. 4 is the same as the camera 10 only except that a DMD chip 14' is used instead of the liquid crystal filter 14 as the light quantity adjustment device of the cameral 10, the same reference characters are used in FIG. 4. Besides, since the structures of the respective portions are the same, the description is omitted.

The DMD chip 14' includes, for example, about one million integrated micro mirrors, and each of the micro mirrors can be independently slanted through digital control by ±10 degrees with respect to the horizontal plane. Then, the micro mirrors are arranged so that when they are slanted (ON state), light incident from an image pickup lens 12 is reflected thereon to be received by an image pickup element located at a desired position of the image pickup device such as a CCD area sensor. The time of the ON state is controlled for each micro mirror, so that the quantity of the light received by the image pickup element of the CCD area sensor 16 in a shooting time is controlled. In such micro mirrors, the time of the ON state of each of the micro mirrors can be controlled by the same structure as the adjustment unit 20 of this embodiment.

In the digital cameras 10 and 10' that are the photographing devices of the present invention as mentioned above, one light quantity adjustment unit such as the liquid crystal filter 14 or DMD chip 14' is used to adjust the (overall) quantity of the light incident from the image pickup lens. More specifically, in the above-mentioned cases, the overall quantity of the light incident on the CCD area sensor 16 is adjusted by one light quantity adjustment unit which was adjusted in accordance with the bright and dark image data obtained by converting the three-color image data, although the image data is obtained by separating into RGB three colors in the 3-color channel CCD area sensor 16.

This is not however the sole case of the present invention, and the quantity of the light incident from the image pickup lens on each color channel of the image pickup element may be adjusted (controlled) for each color channel of the image pickup element such as the CCD area sensor 16. An example is shown in FIG. 5 according to which the quantity of the light incident on the light receiving element for each of the RGB colors in the image pickup element such as a CCD area sensor 16 can be adjusted independently for the image data of each of the RGB three colors.

Thus, it is possible to perform more precise light quantity adjustment for adaptation to the color temperatures of the subject and the background image as in human eyes.

Figure 5:
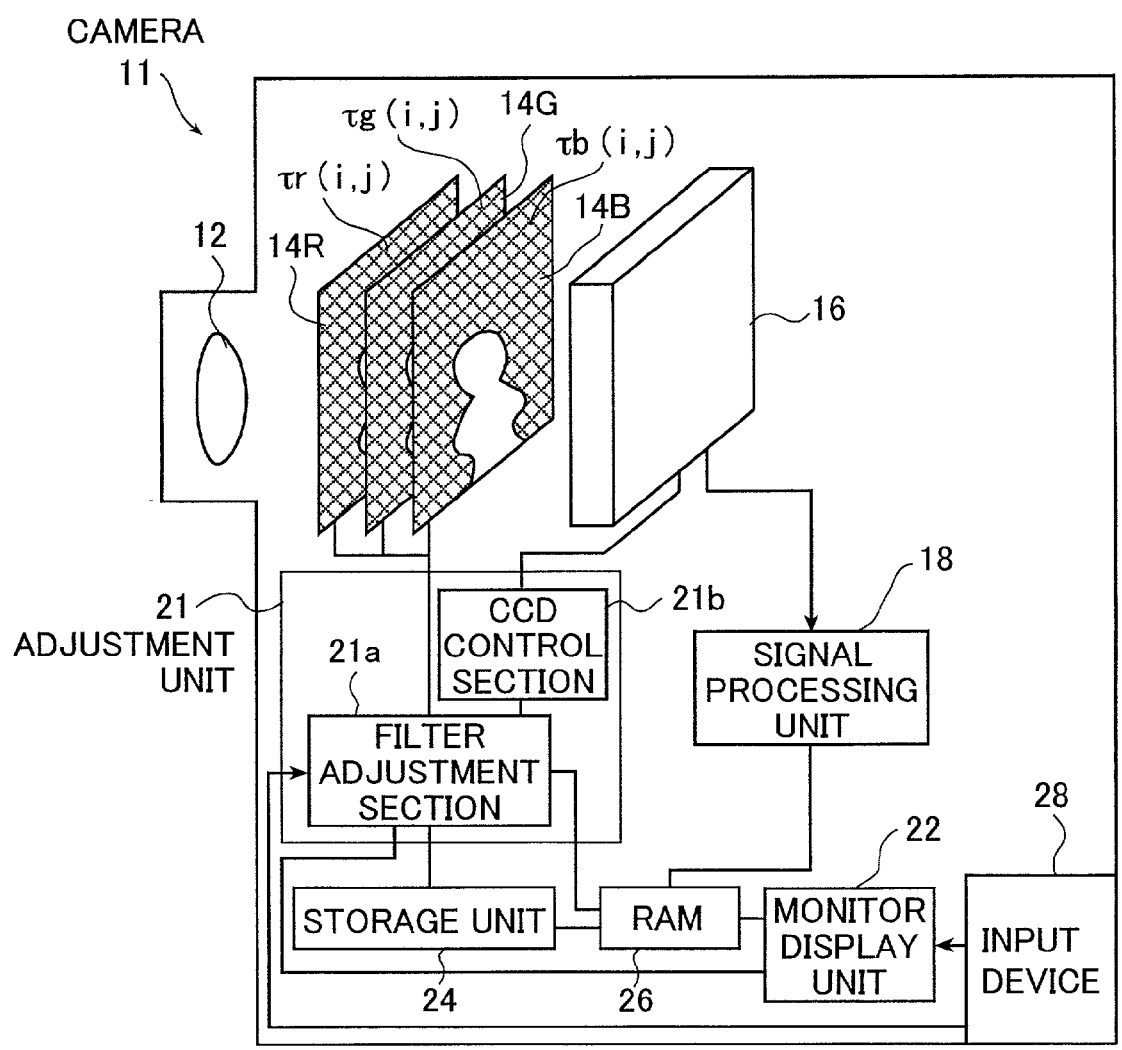
FIG. 5 is a structural view showing a schematic structure of a digital still camera as still another embodiment of a photographing device of the present invention.

A digital camera 11 shown in FIG. 5 is the same as the camera 10 shown in FIG. 1 except that three liquid crystal filters 14R, 14G and 14B are provided for the light quantity adjustment unit and that the light transmittances of the liquid crystal filters 14R, 14G and 14B and the shooting time of the CCD area sensor 16 are adjusted or controlled by an adjustment unit 21 independently for three colors. Therefore, the same reference characters represent the same components and the description thereof is omitted.

For each of these liquid crystal filters 14R, 14G and 14B, any filter can be used which is structurally and functionally similar to the liquid crystal filter 14 shown FIG. 1 except that the quantity of light to be adjusted is not the overall quantity but the quantity for each of the RGB three colors. Therefore, the detailed description is omitted.

The adjustment unit 21 includes a filter adjustment section 21a and a CCD control section 21b. The filter adjustment section 21a sets the adjustment areas and adjustment quantities thereof independently for three colors, or for the light transmittances $\tau r(i,j)$, $\tau g(i,j)$, $\tau b(i,j)$ of the respective liquid crystal filters 14R, 14G and 14B on the basis of the three-color image data of the pre-read image obtained by reading the image of the subject A before the subject A is actually photographed. The CCD control section 21b adjusts the shooting (storage) time of the CCD element for each of the RGB three colors that is previously set in the CCD area sensor 16.

Figure 6:
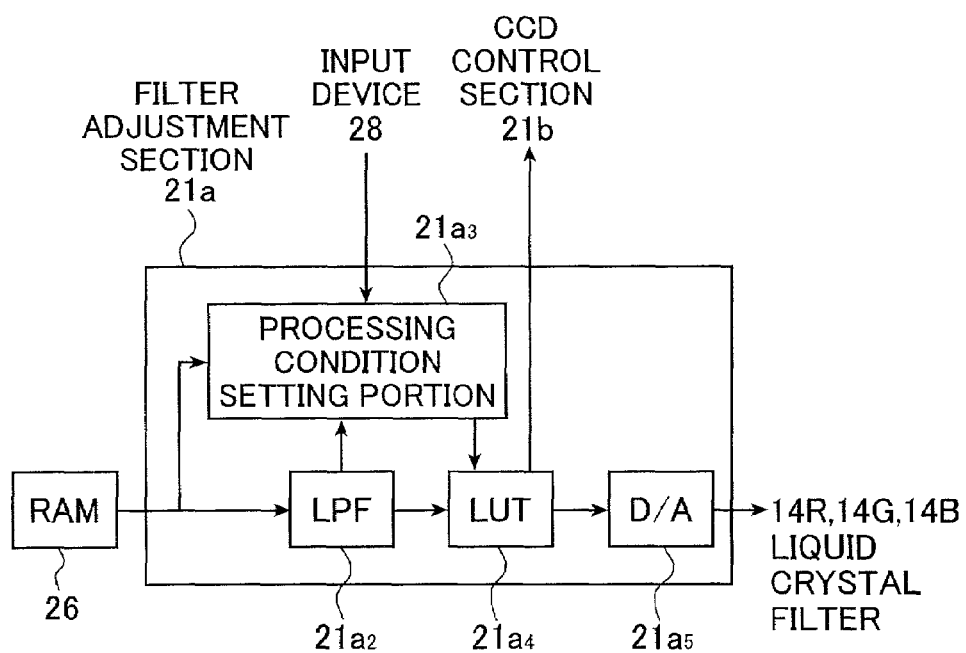
FIG. 6 is a structural view showing a schematic structure of a filter adjustment section of the digital still camera shown in FIG. 5.

The filter adjustment section 21a includes a low pass filter (LPF) $21a_2$, a processing condition setting portion $21a_3$, a second LUT $21a_4$ and a D/A converter $21a_5$, as shown in FIG. 6.

The filter adjustment section 21a shown in FIG. 6 is only different from the filter adjustment section 20a shown in FIG. 2 in that not the bright and dark image data (luminance component Y) and the overall quantity of light, but the image data on each of RGB and the quantity of light for each color are adjusted and that the filter adjustment section 20a includes the MTX arithmetic portion $20a_1$. Therefore, structurally and functionally similar components can be used for the section 21a and the detailed description for the corresponding components is omitted. This is also the case for the CCD control section 21b shown in FIG. 5, which has a similar relation with the CCD control section 20b shown in FIG. 1. Therefore, the detailed description is omitted.

The image data of the pre-read image obtained by reading with the CCD area sensor 16, namely the R image data, G image data and B image data read out of the RAM 26 are inputted to the filter adjustment section 21a and sent to the low pass filter $21a_2$ and the processing condition setting portion $21a_3$.

The low pass filter $21a_2$ performs low pass filtering of the inputted RGB image data independently of each other to thereby extract the low frequency components. The low frequency component for each of the RGB image data obtained in the low pass filter $21a_2$ is sent to the processing condition setting portion $20a_3$ and the second LUT $21a_4$.

The processing condition setting portion $20a_3$ prepares the histograms from each of the RGB image data independently of each other and, on the basis of the thus prepared respective histograms, determines the condition under which the light transmittances $\tau r$, $\tau g$, $\tau b$ of the respective liquid crystal filters 14R, 14G and 14B are adjusted. For example, the function for determining the adjustment area of the liquid crystal filter 14 in which the light transmittances $\tau r$, $\tau g$, $\tau b$ are to be changed, and the adjustment values applied are set on the basis of the respective RGB image data of the pre-read image.

From the conditions, functions or other information sent from the processing condition setting portion $21a_3$, the second LUT $21a_4$ prepares a look up table corresponding to the thus sent conditions or functions and holds it, and on the basis of the respective RGB image data, automatically sets the light transmittance values $\tau r$, $\tau g$, $\tau b$ of the respective liquid crystal filters 14R, 14G and 14B by reference to the look up table, thereby determining the adjustment quantities of the light transmittances $\tau r$, $\tau g$, $\tau b$.

The data on each light transmittance distribution $\tau (i,j)$ obtained in the second LUT $21a_4$ is then sent to the D/A converter $21a_5$ and the CCD control section 21b.

The D/A converter $21a_5$ converts the data on the light transmittance distributions $\tau r(i,j)$, $\tau g(i,j)$, $\tau b(i,j)$ into analog control signals, which are then sent to the liquid crystal filters 14R, 14G and 14B, respectively.

The CCD sensor in the above embodiment has three channels for RGB three colors, but this is not the sole case of the present invention. This sensor may have four or more channels and is also applicable to multi-band cameras.

It goes without saying that the light quantity adjustment for each color according to this embodiment is also applicable to the camera (photographing device) shown in FIG. 4.

According to this embodiment in which the light transmittances $\tau r$, $\tau g$, $\tau b$ of the liquid crystal filters 14R, 14G and 14B are properly adjusted for each color, not only a scene such as a backlight scene or a stroboscopic scene in which the light quantity ratio of a main subject to a background is large and which is susceptible to density failure, but also an image which is susceptible to color failure can be properly photographed by partially adjusting the color temperature for adaptation to the color temperature of the subject.

In the embodiments mentioned above, reading of the subject A for adjusting the light transmittance of the liquid crystal filter 14 or light transmittances of the liquid crystal filters 14R, 14G and 14B (as referred to as "prior image reading"), and reading of the subject A for obtaining the photographed image data (as referred to as "fine image reading") are performed with the same CCD area sensor 16. However, the present invention is not limited to this method and photoelectric readers such as CCD area sensors which are different in the prior image reading and the fine image reading may be used.

Figure 7:
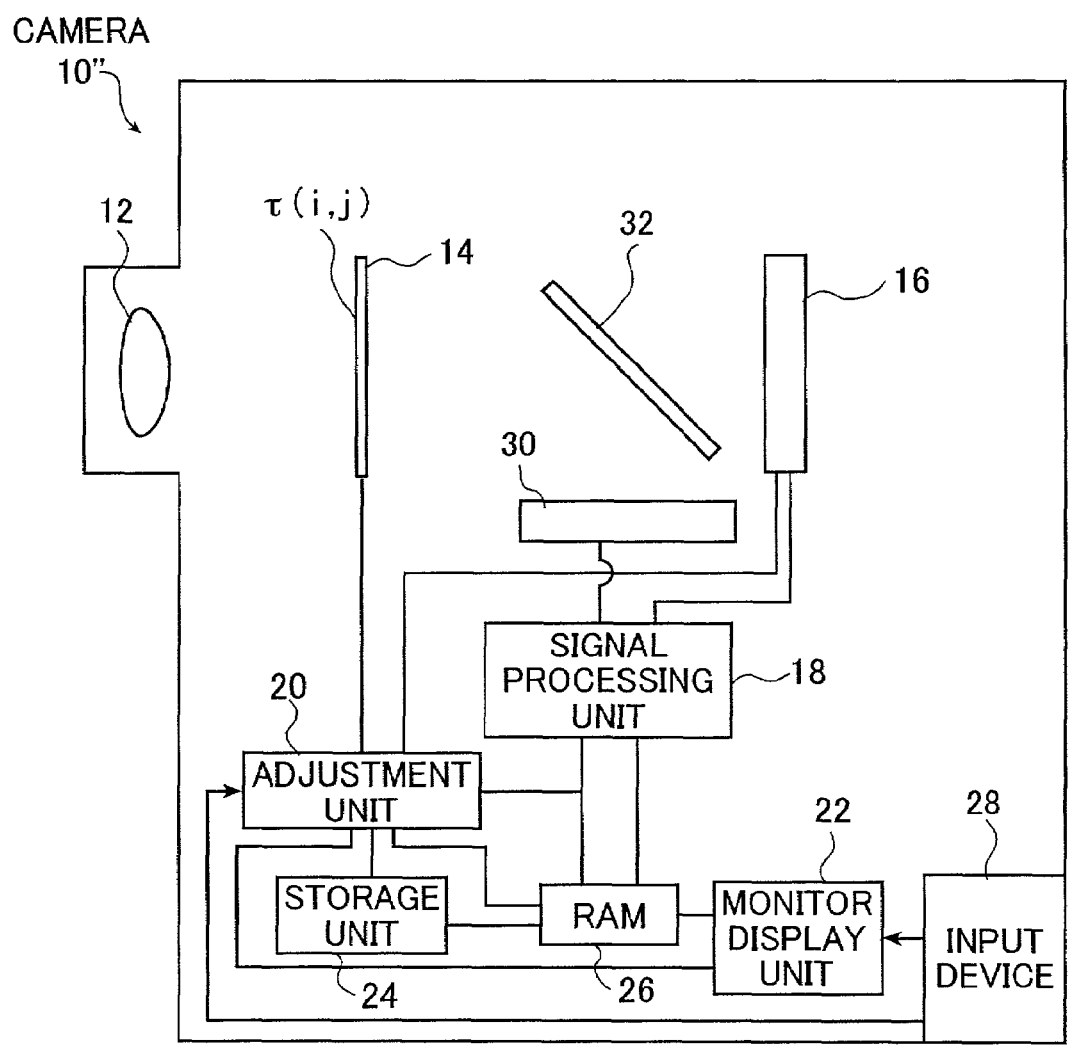
FIG. 7 is a structural view showing a schematic structure of a digital still camera as yet another embodiment of a photographing device of the present invention.

An exemplary digital camera using two CCD area sensors is shown in FIG. 7.

A digital camera 10" shown in FIG. 7 is the same as the camera 10 shown in FIG. 1 except that, in addition to a CCD area sensor 16 in which the subject A is read for obtaining the photographed image data (fine image reading), the camera 10" comprises another area sensor 30 for scene identification and a half mirror 32 for branching the photographing light carrying the image of the subject A incident through an image pickup lens 12 on the CCD area sensor 16. Therefore, the same reference characters represent the same components and the description thereof is omitted.

In the camera 10" shown in FIG. 7, before the photographing light having passed through the half mirror 32 is read with the CCD area sensor 16 as a photographed image, the photographing light branched with the half mirror 32 is read as a pre-read image by the CCD area sensor 30 dedicated for filter adjustment to obtain RGB image signals, which are signal-processed in a signal processing section 18 and then temporarily stored in a RAM 26. At the same time, an adjustment unit 20 sets the light transmittance τ of a liquid crystal filter 14 and the shooting time of the CCD area sensor 16. After these processes, the image of the subject is read as a photographed image in the CCD area sensor 16.

The CCD area sensor 30 dedicated for filter adjustment needs only to have pixel density equivalent to the adjustable pixel density of the liquid crystal filter 14, and hence reading of the image of the subject, processing of the read image signals and arithmetic operation for filter adjustment including setting of the light transmittance of the liquid crystal filter 14 can be performed at a high speed. Thus, the camera 10" of this embodiment can be easily applied to motion picture or continuous shooting mode. This embodiment can of course be applied to the camera 11 shown in FIG. 5.

In the embodiment under consideration, the CCD area sensors 16 and 30 are located in optically conjugate positions with respect to the half mirror 32 so that the optical path length between the image pickup lens 12 and the sensor 16 can be the same as that between the image pickup lens 12 and the sensor 30. A device for branching the optical path of the photographing light is not limited to the half mirror, and any known devices for branching the optical path including a dichroic mirror and a prism can be used. The RGB image signals of the pre-read image outputted from the CCD area sensor 30 are preferably signal-processed in the signal processing unit 18 on a priority basis or exclusively. Further, the thus signal-processed image data may not be temporarily stored in the RAM 26 but be directly inputted to the adjustment unit 20. Furthermore, before the photographing is made, the RGB image signals from the CCD area sensors 16 and 30 may be processed in parallel in the signal processing unit 18 so that one (data of the pre-read image obtained in the CCD area sensor 30) can be inputted to the adjustment unit 20 for filter adjustment and the other (image data read in the CCD area sensor 16) to the monitor display unit 22 for representation.

The photographing devices of the present invention including the cameras 10, 10', 10" and 11 mentioned in the above embodiments can be applied to photographing of a motion picture.

Figure 8:
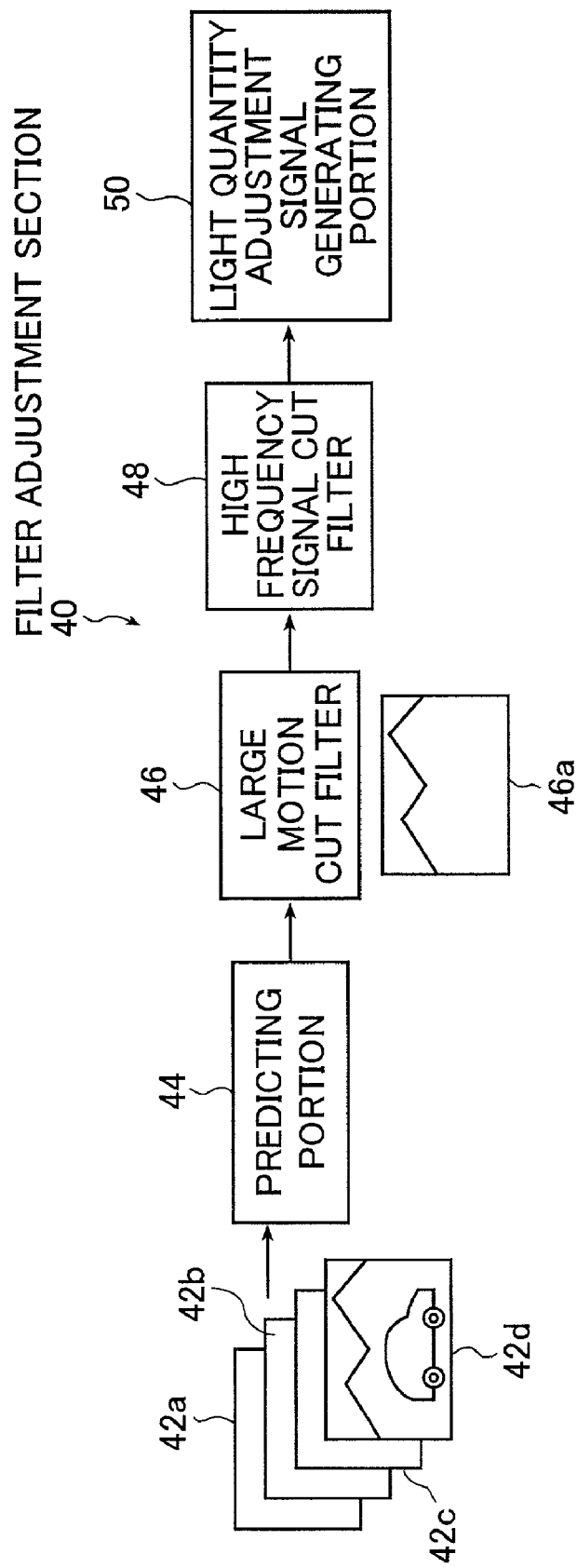
FIG. 8 is a control block diagram illustrating an exemplary light quantity adjustment in motion picture mode that is performed in a filter adjustment section of a photographing device of the present invention.

FIG. 8 shows an exemplary control block diagram of a filter adjustment section 40 in which light quantity adjustment signals in motion picture mode, namely filter adjustment signals are generated.

In motion picture mode, the photographing device requires acquiring image data for the images of temporally consecutive four frames by means of a photoelectric converter such as a CCD area sensor.

Assuming that image data for images 42a, 42b, 42c and 42d of temporally consecutive four frames has been acquired as shown in FIG. 8 (more specifically, Y component is obtained by the MTX arithmetic portion $20a_1$ of the filter adjustment section 20 shown in FIG. 2). The predicting portion 44 extracts and predicts the motion of the subject from the image data of these fours frames (or at least two frames) and thus predicts the image of the frame to be photographed.

Then, image data of an image 46a only composed of a background image in which portions having large motion have been cut off from the image data of the predicted frame or one of the four frames in a large motion cut filter 46 (for example corresponding to the LPF $20a_2$ of the filter adjustment section 20a shown in FIG. 2) can be obtained. From the thus obtained image data, high frequency component including noise is then removed in a high frequency signal cut filter 48, after which the light quantity adjustment signals, namely the adjustment area of the light transmittance in the liquid crystal filter 14 and the adjustment quantity thereof are generated in the light quantity adjustment signal generating portion 50.

In the embodiments mentioned above, a typical case was described in which the photographing device moves a little while the subject moves widely, in other words the background image moves a little. However, the present invention is not limited to these embodiments but is also applicable to the case in which the photographing device moves in conformity with the motion of the subject, in other words, the case in which the subject moves a little while the background image moves widely, or the intermediate case of the cases mentioned above, since a plurality of image information captured in a temporally precedent manner is used in the next step to predict the frame to be photographed.

According to this embodiment in which in continuous shooting mode as in motion pictures or continuously shot images, the motion of the subject is first predicted and then the frame to be photographed is predicted before the light transmittance τ of the liquid crystal filter 14 is adjusted, even a motion picture of a scene such as a backlight scene or a stroboscopic scene in which the light quantity ratio of a main subject to a background is large and which is susceptible to density failure can be properly photographed. When the motion picture mode is applied to the camera 11 shown in FIG. 5, even a motion picture of a scene which is susceptible to density failure or further color failure can be also photographed properly.

Next, the function of the photographing device of the present invention will be described on the basis of the camera 10 shown in FIG. 1.

First, for the light quantity adjustment of the subject A to be photographed, the pre-read image of the subject A is taken. The light transmittance τ of the liquid crystal filter 14 is uniformly set at a previously set light transmittance, for example, the light transmittance τ is 50%. The shooting time of the CCD area sensor 16 is set at a previously set shooting time.

An image signal as an output signal of the subject A taken by the CCD area sensor 16 under such photographing conditions is sent to the signal processing unit 18, is amplified in the amplifier 18a, is converted into a digital signal in the A/D converter 18b, and then, is subjected to Log (logarithm) conversion in the first LUT 18c, and is subjected to well-known data processing, such as dark correction, smear correction, flaw defect correction or shading correction, in the data processing section 18$d$, so that the image data of the pre-read image is generated. The obtained image data is once stored in the RAM 26.

On the basis of the stored image data, the pre-read image of the subject A is displayed on the monitor display unit 22. A photographer sees the displayed pre-read image, and judges whether the image of a bright portion (highlight) is washed-out or that of a dark portion (shadow) is dull and the light quantity adjustment is necessary. In the case where it is judged that the light quantity adjustment is necessary, the instruction for the light quantity adjustment is inputted by the input device 28.

When the instruction for the light quantity adjustment is received, previously set values are used for various parameters for the light quantity adjustment, for example, the foregoing value $Y_1$, the inclination $\alpha_1$, and the like, and the light transmittance distribution $\tau$ (i, j) of the liquid crystal filter 14 is adjusted. The filter adjustment section 20$a$ requests the photographer to input various parameters for the light quantity adjustment, such as the value $Y_1$ and the inclination $\alpha_1$, and the light transmittance distribution $\tau$ (i, j) of the liquid crystal filter 14 is adjusted, as described later, by the various parameters for the light quantity adjustment inputted by the input device 28.

In the adjustment of the light transmittance distribution $\tau$ (i, j) of the liquid crystal filter 14, first, the stored image data of the pre-read image of the subject A is read from the RAM 26 and is sent to the filter adjustment section 20$a$ of the adjustment unit 20.

In the filter adjustment section 20$a$, first, in the MTX arithmetic portion 20$a_1$, the Y component of the image data of the pre-read image obtained by the YIQ conversion, or the bright and dark image data, is obtained in accordance with the above-mentioned expression (1).

The thus obtained Y component of the image data of the pre-read image is sent to the low pass filter 20$a_2$ and the processing condition setting portion 20$a_3$.

Thereafter, in the processing condition setting portion 20$a_3$, the processing condition for the light quantity adjustment is set, and on the other hand, the Y component of the image data of the pre-read image obtained in the low pass filter 20$a_2$ is subjected to the low pass filter processing, and the low frequency component is extracted. Since the low frequency component of the Y component of the image data of the pre-read image is extracted in the low pass filter 20$a_2$, a blur image is obtained for the area of the bright portion (highlight) and the dark portion (shadow) of the image of the subject A. For adjusting the light quantity in the second LUT portion 20$a_4$ using information of the blur image, the light transmittance distribution $\tau$ (i, j) of the liquid crystal filter 14 is set.

That is, in the processing condition setting portion 20$a_3$, histograms as shown in FIGS. 3A, 3C and 3E are prepared from the sent image data of the low frequency component of the Y component of the pre-read image. Previously set values are used for various parameters for the light quantity adjustment, such as the value $Y_1$ and the inclination $\alpha_1$, and the light quantity adjustment area, for example, the bright portion or the dark portion, or the light quantity adjustment portion in the bright portion and the dark portion, is automatically set. Alternatively, values inputted by the photographer through the input device 28 are used to set the light quantity adjustment area. Then, the functions of the light transmittance $\tau$ with respect to the value of the Y component as shown in FIGS. 3B, 3D and 3F are set. Thereafter, the information on the functions of the light transmittance $\tau$ are sent to the second LUT 20$a_4$.

Besides, with respect to the dark portion and the bright portion of the pre-read image displayed on the monitor display unit 22, the portion or a typical position included in the portion is designated by the input device 28 such as a pointing device, and the light quantity adjustment portion may be set by this designation. In the case of such designation by the input device 28, the value $Y_1$ or the like shown in FIG. 3B is automatically set in accordance with the value of the Y component in the position designated by the input device 28, and on the basis of that, the image area having a Y component of the value $Y_1$ or less is automatically set as the portion where the light quantity is adjusted by adjustment of the light transmittance of the liquid crystal filter 14. With respect to the inclination $\alpha_1$ to be used may be previously set or inputted by the input device 28.

In the second LUT 20$a_4$, from the sent information on the functions, a look up table expressing the functions as shown in FIGS. 3B, 3D and 3F is prepared, and on the basis of the low frequency component of the Y component of the image data of the pre-read image sent from the low pass filter 20$a_2$, the value of the light transmittance $\tau$ of the liquid crystal filter 14 is automatically set by referring to the look up table.

The data of the light transmittance distribution $\tau$ (i, j) obtained in the second LUT 20$a_4$ is sent to the D/A converter 20$a_5$ and the CCD control section 20$b$.

In the D/A converter 20$a_5$. the data of the light transmittance distribution $\tau$ (i, j) is converted into an analog control signal, and the obtained control signal is sent to the liquid crystal filter 14.

In the CCD control section 20$b$, on the basis of the sent data of the light transmittance distribution $\tau$ (i, j), a shooting time previously set in the CCD area sensor 16 is adjusted. The light transmittance distribution $\tau$ (i, j) is set from the uniform light transmittance of the liquid crystal filter 14, for example, the light transmittance of 50%, which prevents under exposure or over exposure caused by the change in the quantity of the light received in the shooting time for the image of the subject A.

Besides, an image of the subject A which is photographed after the light quantity adjustment is made on the basis of the pre-read image, that is, a predicted image obtained by simulation on the basis of the pre-read image may be displayed on the monitor display unit 22.

In this way, the light transmittances of the liquid crystal cell of the liquid crystal filter 14 and the shooting time of the CCD area sensor 16 are adjusted, and the image of the subject A is taken. The image signal obtained by photographing is sent to the signal processing unit 18, is amplified in the amplifier 18$a$, is converted into a digital signal in the A/D converter 18$b$, and thereafter, is subjected to Log conversion in the first LUT 18$c$, and is subjected to a well-known data processing, such as dark correction, smear correction, flaw defect correction or shading correction, in the data processing section 18$d$, so that the image data is obtained. The obtained image data is stored in the RAM 26 and is displayed on the monitor display unit 22. The image data stored in the RAM 26 is read out, and is stored and held in the storage unit 24 together with the information such as the light transmittance distributions $\tau$ (i, j) corresponding to the position (i, j) of the liquid crystal cell of the liquid crystal filter 14 and the shooting time of the CCD area sensor 16.

The incident light carrying the obtained image of the subject A is subjected to the light quantity adjustment by the liquid crystal filter 14, and the image is formed on the CCD area sensor 16. Thus, the image of a scene having a large light quantity ratio can be photoelectrically suitably read and recorded.

Besides, as compared with the multi-plate image pickup device disclosed in Japanese Patent Unexamined Publication No. Hei. 7-298276 and provided with the plurality of image pickup elements respectively corresponding to the divided incident lights, a device for dividing incident light, a device for synthesizing images read by the respective image pickup elements, and the like, the structure is simplified, the cost is prevented from increasing, and the time required for processing the image data is short.

Further, since the information on the light quantity adjustment, such as the light transmittance distribution $\tau$ (i, j) and the shooting time is recorded together with the image data, the image of the subject A which could have been obtained in the case where the light transmittance is not adjusted in the liquid crystal filter 14 can be obtained by calculation from the image data, the light transmittance distribution $\tau$ (i, j), the shooting time, and the like, after the image is taken. The adjustment of the bright and dark portions of the image can be again made by the image processing method as disclosed in Japanese Patent Unexamined Publication No. Hei. 10-13680.

Although the photographing device of the present invention has been described in detail, the present invention is not limited to the above embodiments, but various improvements and modifications may be naturally made in the scope not departing from the gist of the present invention.

As described above in detail, according to the present invention, since the light quantity adjustment device for partially adjusting the light quantity of the image of the subject is provided in the optical path between the optical lens and the image pickup device, the image of the scene having a large light quantity ratio, such as a backlight scene or a stroboscopic scene in which the light quantity ratio of a main subject to a background is large, can be suitably read and recorded. Especially, in the CCD image pickup element or the like in which the dynamic range is restricted, the image of the scene having a large light quantity ratio can be suitably photoelectrically read and recorded.

In a type in which a photoelectric converter dedicated for filter adjustment different from the photographing unit such as a photographing photoelectric converter is provided according to the invention, reading of the image of the subject, processing of the read image signals and arithmetic operation or setting of the adjustment quantity of the light quantity in the light quantity adjustment unit can be performed at a high speed, and the photographing device of this type can be easily applied to motion picture or continuous shooting mode.

According to the present invention, in continuous shooting mode as in motion pictures or continuously shot images, first the motion of a subject or frames and then the frame to be photographed are predicted before the light quantity in the light quantity adjustment unit is adjusted. Therefore, even a motion picture of a scene in which the light quantity ratio of a main subject to a background is large and which is susceptible to density failure can be properly photographed.

Further, in a type in which the light quantity in the light quantity adjustment unit is adjusted for each color according to the present invention, not only a scene in which the light quantity ratio of a main subject to a background is large and which is susceptible to density failure, but also an image which is susceptible to color failure and further a motion picture can be properly photographed by partially adjusting the color temperature for adaptation to the color temperature of the subject.

What is claimed is:

1. A photographing device comprising:
   an optical lens;
   a photographing unit for taking an image of a subject imaged through the optical lens; and
   a light quantity adjustment unit for partially adjusting a light quantity of the image of said subject, which is provided in an optical path of light carrying the image of said subject and between said optical lens and said photographing unit;
   wherein said light quantity adjustment unit is a unit for adjusting the light quantity of the image of said subject for each color channel of said photographing unit, said light quantity adjustment unit is a unit for relatively reducing a light quantity of an area corresponding to a bright portion of the image of said subject or said light quantity adjustment unit is a unit for relatively increasing a light quantity of an area corresponding to a dark portion of the image of said subject when the image is taken by said photographing unit.

2. The photographing device according to claim 1, wherein said photographing unit is an image pickup device for photoelectrically reading the image of said subject or a unit for recording the image of said subject on a photosensitive material.

3. The photographing device according to claim 1, wherein said light quantity adjustment unit is a filter through which the light carrying the image of said subject is transmitted and is a light transmittance variable filter which changes a light transmittance of an area corresponding to a portion of the image of said subject where the light quantity is adjusted.

4. The photographing device according to claim 1, wherein said light quantity adjustment unit is disposed at a position deviating from an imaging position where the image of said subject is imaged by said optical lens.

5. A photographing device comprising:
   an optical lens;
   a photographing unit for taking an image of a subject imaged through the optical lens; and
   a light quantity adjustment unit for partially adjusting a light quantity of the image of said subject, which is provided in an optical path of light carrying the image of said subject and between said optical lens and said photographing unit,
   wherein said light quantity adjustment unit is a reflection plate for partially changing a light receiving time in which said photographing unit receives reflected light, correspondingly to a portion of the image of said subject where the light quantity is adjusted, by changing a reflection angle of the light carrying the image of said subject.

6. The photographing device according to claim 5, wherein said light quantity adjustment unit is a unit for relatively reducing a light quantity of an area corresponding to a bright portion of the image of said subject when the image is taken by said photographing unit.

7. The photographing device according to claim 5, wherein said light quantity adjustment unit is a unit for relatively increasing a light quantity of an area corresponding to a dark portion of the image of said subject when the image is taken by said photographing unit.

8. A photographing device comprising:
   an optical lens;
   a photographing unit for taking an image of a subject imaged through the optical lens; and
   a light quantity adjustment unit for partially adjusting a light quantity of the image of said subject, which is provided in an optical path of light carrying the image of said subject and between said optical lens and said photographing unit;

wherein when said photographing unit is a unit for reading the image of said subject photoelectrically, said photographing device further includes a condition setting unit for setting an adjustment area of said light quantity adjustment unit corresponding to a light quantity adjustment portion of the image of said subject, based on image data of a pre-read image which was obtained by previously reading the image of said subject under a predetermined photographing condition by using said photographing unit, wherein said condition setting unit includes a signal converter for converting said image data into bright and dark image data, and sets said adjustment area based on said bright and dark image data obtained in said signal converter, and wherein said condition setting unit includes a low frequency component extractor for extracting a low frequency component of said bright and dark image data obtained by converting in said signal converter, and sets said adjustment area based on the thus extracted low frequency component.

9. The photographing device according to claim 8, wherein said condition setting unit sets for each color channel of said photographing unit, the adjustment area of said light quantity adjustment unit corresponding to the light quantity adjustment portion of the image of said subject, based on image data obtained for said each color channel from said pre-read image read by said photographing unit.

10. The photographing device according to claim 8, wherein said condition setting unit sets said adjustment area of said light quantity adjustment unit, based on information for designating a position of the light quantity adjustment portion on said pre-read image, an image read with a second photoelectric converter or an image taken in a temporally precedent manner.

11. A photographing device comprising:
an optical lens;
a photographing unit for taking an image of a subject imaged through the optical lens; and
a light quantity adjustment unit for partially adjusting a light quantity of the image of said subject, which is provided in an optical path of light carrying the image of said subject and between said optical lens and said photographing unit;
wherein when said photographing unit is a first photoelectric converter for reading the image of said subject photoelectrically, said photographing device further includes:
a second photoelectric converter which is different from the first photoelectric converter; and
a condition setting unit for setting an adjustment area of said light quantity adjustment unit corresponding to a light quantity adjustment portion of the image of said subject, based on image data of an image obtained by reading the image of said subject with the second photoelectric converter.

12. The photographing device according to claim 11, wherein said condition setting unit sets for each color channel of said second photoelectric converter, the adjustment area of said light quantity adjustment unit corresponding to the light quantity adjustment portion of the image of said subject, based on image data obtained for said each color channel from said image read by said second photoelectric converter.

13. A photographing device comprising:
an optical lens;
a photographing unit for taking an image of a subject imaged through the optical lens; and
a light quantity adjustment unit for partially adjusting a light quantity of the image of said subject, which is provided in an optical path of light carrying the image of said subject and between said optical lens and said photographing unit;
wherein when said photographing unit is a unit capable of photoelectrically taking the image of said subject in succession as a plurality of images, said photographing device further includes a condition setting unit for setting an adjustment area of said light quantity adjustment unit corresponding to a light quantity adjustment portion of the image of said subject, based on image data of an image taken in a temporally precedent manner, and
wherein said condition setting unit determines a degree of a motion from said plurality of images taken in succession and sets the adjustment area of said light quantity adjustment unit in accordance with the degree of the motion.

14. A photographing device comprising:
an optical lens;
a photographing unit for taking an image of a subject imaged through the optical lens; and
a light quantity adjustment unit for partially adjusting a light quantity of the image of said subject, which is provided in an optical path of light carrying the image of said subject and between said optical lens and said photographing unit;
wherein when said photographing unit is a unit capable of photoelectrically taking the image of said subject in succession as a plurality of images, said photographing device further includes a condition setting unit for setting an adjustment area of said light quantity adjustment unit corresponding to a light quantity adjustment portion of the image of said subject, based on image data of an image taken in a temporally precedent manner, and
wherein when said photographing unit is a first photoelectric converter for reading the image of said subject photoelectrically, said photographing device further includes a second photoelectric converter which is different from the first photoelectric converter and wherein the image data of the image taken in said temporally precedent manner is image data of an image obtained by reading the image of said subject with said second photoelectric converter.

15. A photographing device comprising:
an optical lens;
a photographing unit for taking an image of a subject imaged through the optical lens; and
a light quantity adjustment unit for partially adjusting a light quantity of the image of said subject, which is provided in an optical path of light carrying the image of said subject and between said optical lens and said photographing unit;
wherein when said photographing unit is a unit for reading the image of said subject photoelectrically, information on an adjustment of the light quantity in said light quantity adjustment unit is recorded and held together with image data read after the adjustment has been made by said light quantity adjustment unit.

* * * * *